US009253351B2

(12) United States Patent
Ito

(10) Patent No.: US 9,253,351 B2
(45) Date of Patent: Feb. 2, 2016

(54) ORIGINAL READING APPARATUS WITH DETECTING DEVICE FOR DETECTING EXISTENCE OF ORIGINAL

(71) Applicant: BROTHER KOGYO KABUSHIKI KAISHA, Nagoya, Aichi (JP)

(72) Inventor: Tomoya Ito, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/470,012

(22) Filed: Aug. 27, 2014

(65) Prior Publication Data

US 2015/0062662 A1 Mar. 5, 2015

(30) Foreign Application Priority Data

Aug. 30, 2013 (JP) ................................. 2013-180337

(51) Int. Cl.
*H04N 1/00* (2006.01)
(52) U.S. Cl.
CPC ....... *H04N 1/00824* (2013.01); *H04N 1/00588* (2013.01); *H04N 1/00663* (2013.01); *H04N 1/00803* (2013.01); *H04N 2201/0081* (2013.01)
(58) Field of Classification Search
None
See application file for complete search history.

(56) References Cited

U.S. PATENT DOCUMENTS

| | | | | |
|---|---|---|---|---|
| 6,173,150 B1* | 1/2001 | Suzuki et al. | ................. | 399/315 |
| 2004/0165223 A1* | 8/2004 | Ishido et al. | ................. | 358/449 |
| 2007/0285690 A1* | 12/2007 | Matsuda et al. | ............... | 358/1.9 |
| 2008/0226339 A1* | 9/2008 | Sato | ............................. | 399/114 |
| 2013/0058662 A1* | 3/2013 | Nomura | ......................... | 399/15 |
| 2013/0083374 A1* | 4/2013 | Nagai | ............................ | 358/488 |
| 2014/0029021 A1* | 1/2014 | Omata | ........................... | 358/1.2 |
| 2014/0192386 A1* | 7/2014 | Ishida | ........................... | 358/449 |

FOREIGN PATENT DOCUMENTS

| | | |
|---|---|---|
| JP | H05-153345 A | 6/1993 |
| JP | 2003-267592 A | 9/2003 |
| JP | 2008-147976 A | 6/2008 |

\* cited by examiner

*Primary Examiner* — Helen Q Zong
(74) *Attorney, Agent, or Firm* — Scully, Scott, Murphy & Presser, PC

(57) ABSTRACT

In an original reading apparatus, a conveying mechanism and a reading device start a conveying operation and a reading operation to acquire a read image when a detecting device detects an existence of an original. The read image is acquired in a first direction and has a prescribed width in a second direction orthogonal to the first direction. The first direction corresponds to a conveying direction of the original. A control device determines whether or not the read image includes an overall solid region with a single color. The overall solid region has: a length in the first direction longer than or equal to a prescribed length; and a width in the second direction equal to the prescribed width. When the read image includes the overall solid region, the control device outputs a signal indicative of incorrect detection of the existence of the original due to external light.

20 Claims, 7 Drawing Sheets

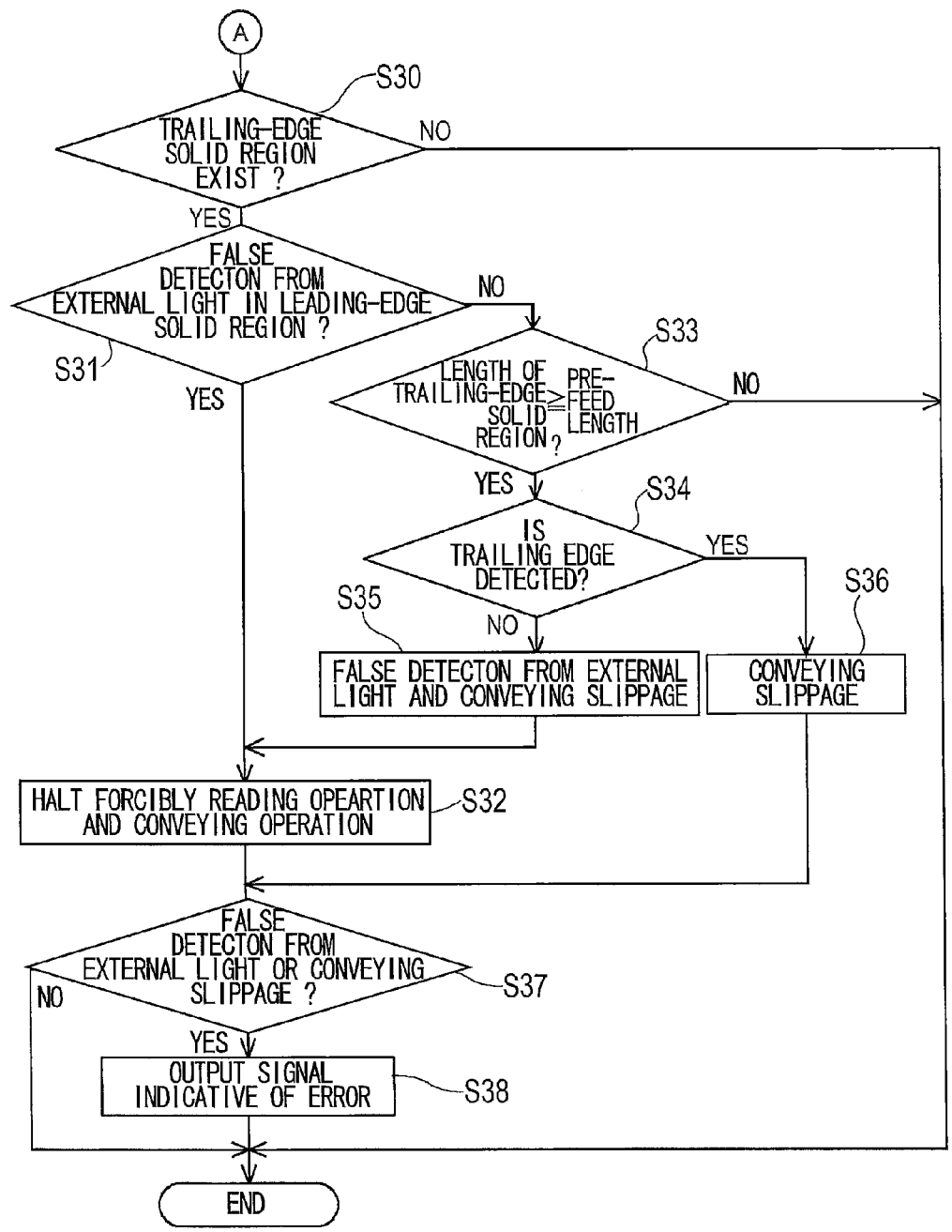

ORIGINAL READING APPARATUS WITH DETECTING DEVICE FOR DETECTING EXISTENCE OF ORIGINAL

CROSS REFERENCE TO RELATED APPLICATION

This application claims priority from Japanese Patent Application No. 2013-180337 filed Aug. 30, 2013. The entire content of the priority application is incorporated herein by reference.

TECHNICAL FIELD

The present invention relates to an original reading apparatus.

BACKGROUND

An original reading apparatus including an automatic document feeder (hereinafter "ADF") for automatically feeding sheets of an original is well known in the art. One example of this original reading apparatus is a copying device including an ADF, an entry sensor that detects the leading edge of an original fed onto a platen, and conveying rollers that perform a preliminary conveying operation (hereinafter "pre-feed") for conveying the original a prescribed amount when the sensor detects the leading edge of the original. Through this pre-feed, the copying device conveys the original over the platen until the leading edge of the original reaches a read position.

Another original reading apparatus known in the art is an original reader that includes an ADF, a sensor for detecting the leading edge of an original, conveying rollers for executing a pre-feed once the sensor detects the leading edge of an original in order to feed the original to the read position, and reading unit for detecting changes in reflected light so as to recognize when the leading edge of the original has arrived at the read position before beginning an operation to read the original.

In general, the ADF-equipped original reading apparatuses described above begin a pre-feed when an original has been placed onto the platen. Once the pre-feed is completed, the user inputs a read command into the original reading apparatus, and the original reading apparatus begins executing a reading operation and a conveying operation for the original in response to the read command. Since the original reading apparatus automatically conveys the original to the read position when the original is placed on the platen, this method of reading an original can shorten the time required for the device to begin reading the original after the user inputs a read command.

SUMMARY

An optical sensor has commonly been used to detect when an original has been fed. This type of optical sensor includes a light-emitting unit for emitting light toward a detection position, and a light-receiving unit for receiving light reflected from the detection position. One type of optical sensor is configured to turn on when the light-receiving unit detects light, and off when the light-receiving unit does not detect light. Thus, when light emitted from the light-emitting unit of the optical sensor is reflected off an original and detected by the light-receiving unit, the optical sensor switches from off to on, enabling the original reading apparatus to determine that the leading edge of an original is present at the detection position.

However, the inventors of the present invention newly discovered a problem with the above-described original reading apparatus. Namely, external light is sometimes detected by the light-receiving unit of the optical sensor, leading the original reading apparatus to mistakenly detect this external light as light reflected off an original, despite an original not actually being present at the detection position. Upon mistakenly detect an original, the original reading apparatus performs a virtual pre-feed, following which the device mistakenly determines that the pre-feed has been completed. Thus, if a user subsequently inserts an original onto the platen and inputs a read command while the original reading apparatus is in this state, the original reading apparatus will begin the reading operation and conveying operation for the original without first performing a pre-feed, having mistakenly determined that the pre-feed was previously completed. As a result, the original reading apparatus will generate image data of a single color (normally black) for a region occupying the leading edge of the scanned image and having a length equivalent to the distance of the pre-feed and a width equivalent to the entire width of the scanned image. Additionally, when a reading length has been set in the original reading apparatus, the trailing edge portion of the original image will be cut from the image data generated by the original reading apparatus.

In view of the foregoing, it is an object of the present invention to provide an original reading apparatus having an ADF that is capable of determining when the original-detecting device has mistakenly detected external light as light reflected off an original.

In order to attain the above and other objects, the invention provides an original reading apparatus may include a conveying mechanism, a reading device, a detecting device, and a control device. The conveying mechanism may be configured to perform a conveying operation to convey an original in a conveying direction. The reading device may be configured to perform a reading operation to read the original that is conveyed by the conveying mechanism. The detecting device may be disposed upstream of the reading device in the conveying direction and configured to optically detect an existence of the original at a detection position. The control device may be configured to: control, when the detecting device detects the existence of the original at the detection position, the conveying mechanism and the reading device to start the conveying operation and the reading operation to acquire a read image, the read image being acquired in a first direction and having a prescribed width in a second direction orthogonal to the first direction, the first direction corresponding to the conveying direction; determine whether or not the read image includes an overall solid region with a single color, the overall solid region having a length in the first direction longer than or equal to a prescribed length and having a width in the second direction equal to the prescribed width; and output a signal indicative of incorrect detection of the existence of the original by the detecting device due to external light when it is determined that the read image includes the overall solid region.

According to another aspect, the present invention provides a non-transitory computer-readable storage medium storing a set of program instructions executed by one of an original reading apparatus and a computer connected to the original reading apparatus. The original reading apparatus may include a conveying mechanism, a reading device, a detecting device, and a control device. The conveying mechanism may be configured to perform a conveying operation to convey an original in a conveying direction. The reading device may be configured to perform a reading operation to read the original that is conveyed by the conveying mechanism. The detecting device may be disposed upstream of the reading device in the conveying direction and configured to optically detect an existence of the original at a detection position. The control device may be configured to control, when the detecting device detects the existence of the original at the detection position, the conveying mechanism and the reading device to start the conveying operation and the reading operation to acquire a read image. The program instructions may cause the one of the original reading apparatus and the computer to: determine whether or not the read image includes an overall solid region with a single color, the read image being acquired in a first direction and having a prescribed width in a second direction orthogonal to the first direction, the first direction corresponding to the conveying direction, the overall solid region having a length in the first direction longer than or equal to a prescribed length and having a width in the second direction equal to the prescribed width; and output a signal indicative of incorrect detection of the existence of the original by the detecting device due to external light when it is determined that the read image includes the overall solid region.

According to another aspect, the present invention provides a control method executed by one of an original reading apparatus and a computer connected to the original reading apparatus. The original reading apparatus may include a conveying mechanism, a reading device, a detecting device, and a control device. The conveying mechanism may be configured to perform a conveying operation to convey an original in a conveying direction. The reading device may be configured to perform a reading operation to read the original that is conveyed by the conveying mechanism. The detecting device may be disposed upstream of the reading device in the conveying direction and configured to optically detect an existence of the original at a detection position. The control device may be configured to control, when the detecting device detects the existence of the original at the detection position, the conveying mechanism and the reading device to start the conveying operation and the reading operation to acquire a read image. The method may include: determining whether or not the read image includes an overall solid region with a single color, the read image being acquired in a first direction and having a prescribed width in a second direction orthogonal to the first direction, the first direction corresponding to the conveying direction, the overall solid region having a length in the first direction longer than or equal to a prescribed length and having a width in the second direction equal to the prescribed width; and outputting a signal indicative of incorrect detection of the existence of the original by the detecting device due to external light when it is determined that the read image includes the overall solid region.

BRIEF DESCRIPTION OF THE DRAWINGS

The particular features and advantages of the invention as well as other objects will become apparent from the following description taken in connection with the accompanying drawings, in which:

FIGS. 9 and 10 are flowcharts illustrating steps in a false detection determination process performed by the original reading apparatus.

DETAILED DESCRIPTION

Figure 1:
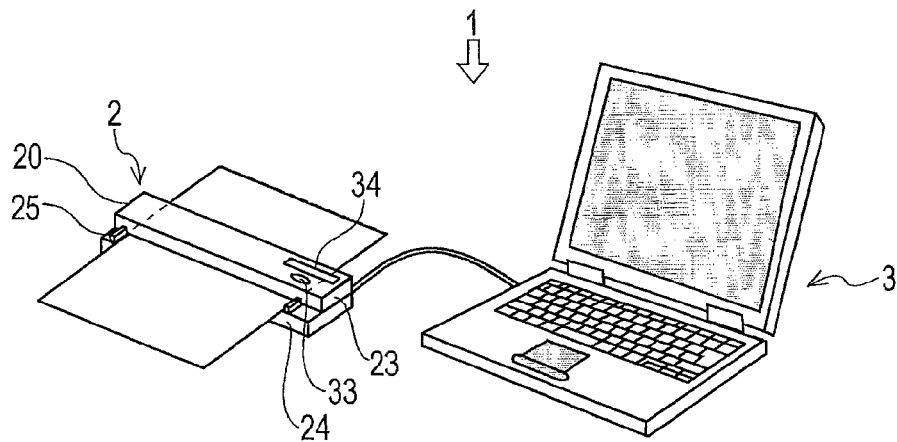
FIG. 1 is a schematic diagram of an image-processing system including an original reading apparatus according to an embodiment of the present invention.

Next, an embodiment of the present invention will be described while referring to FIGS. 1 to 10. FIG. 1 is a schematic diagram of an image-processing system 1 having an original reading apparatus according to the embodiment. As shown in FIG. 1, the image-processing system 1 includes a portable scanner 2 serving as an example of the original reading apparatus, and a computer 3. The scanner 2 is equipped with an automatic reading function (ADF). The computer 3 is connected to the scanner 2 and capable of communicating with the same.

First, the general structure of the scanner 2 will be described. The scanner 2 includes an enclosure 20, an image sensor 26, an original presser 27, conveying rollers 28, an original sensor 29, pinch rollers 38, a control device 40, and a conveying motor 42. As shown in FIG. 1, the enclosure 20 has a general rectangular shape in a plan view, with its long dimension aligned in a width direction Y that is substantially orthogonal to a conveying direction X in which originals are conveyed. The enclosure 20 includes a bottom enclosure 24, and a top enclosure 23 stacked on top of the bottom enclosure 24. The top enclosure 23 is further provided with an operating key 33, and a liquid crystal display (LCD) 34 serving as an example of a notifying device. The operating key 33 is a push button. The user presses the operating key 33 to input a command to a control device 40 described later in order to initiate a reading operation. The bottom enclosure 24 is provided with a pair of guides 25 described later.

Figure 2:
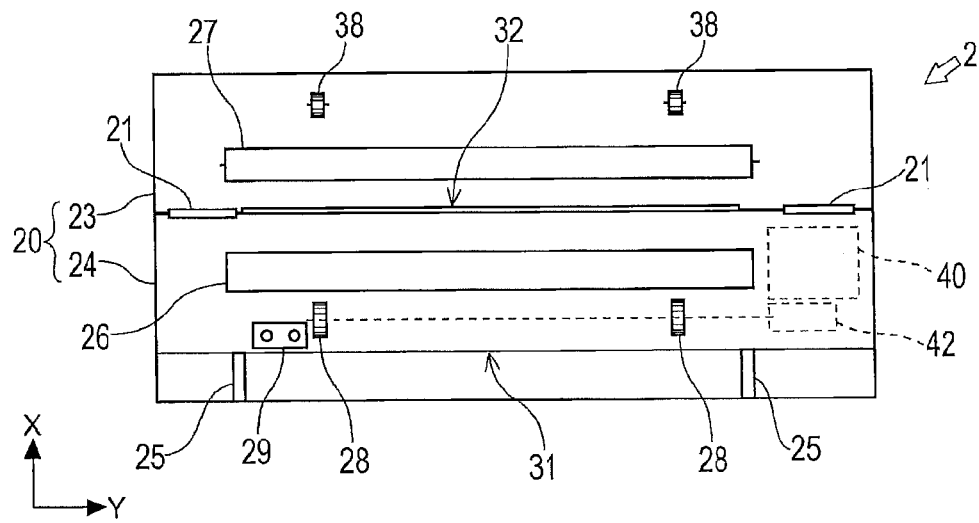
FIG. 2 shows the original reading apparatus in an opened state.

FIG. 2 shows the structure of the scanner 2 when the scanner 2 has been opened and serves to illustrate an original detection position and a reading position in the scanner 2. The scanner 2 can be opened to the state shown in FIG. 2 through a pair of hinges 21 that connect the top enclosure 23 and the bottom enclosure 24 together.

Figure 3:
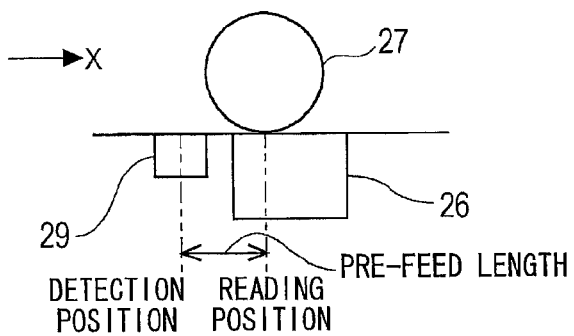
FIG. 3 is an explanatory diagram showing positional relationships between a detection position and a reading position in the original reading apparatus.

As shown in FIGS. 2 and 3, the image sensor 26 is provided on the top surface of the bottom enclosure 24, with its longitudinal dimension oriented in the width direction Y. The image sensor 26 is a compact image sensor, for example, configured as a module that includes a light-receiving element, a light source, a lens array, and a circuit board. The image sensor 26 is configured to perform a reading operation to read an original conveyed by the conveying rollers 28. The image sensor 26 serves as an example of a reading device. The original presser 27 is provided on the bottom surface of the top enclosure 23 in a position to confront the image sensor 26 when the scanner 2 is in the closed state shown in FIG. 1.

The conveying rollers 28 and the original sensor 29 are also provided on the bottom enclosure 24 upstream of the image sensor 26 in the conveying direction X. In the operating state shown in FIG. 1, the pinch rollers 38 are provided on the bottom surface of the top enclosure 23 in positions for confronting the respective conveying rollers 28 when the scanner 2 is closed. When the scanner 2 is in the operating state with the top enclosure 23 and bottom enclosure 24 closed together (see FIG. 1), the top enclosure 23 is positioned above the image sensor 26, the conveying rollers 28, and the original sensor 29 and conceals these components from the outside.

The control device 40 and the conveying motor 42 are also provided in the bottom enclosure 24. The conveying motor 42 drives the conveying rollers 28 to rotate under control of the control device 40. Together the conveying motor 42 and the conveying rollers 28 are configured to perform a conveying operation to convey an original in the conveying direction X, and serve as an example of a conveying mechanism.

In addition, the pair of guides 25 is provided on the bottom enclosure 24. The guides 25 are spaced apart from each other in the width direction Y and positioned upstream of the original sensor 29 in the conveying direction X. It is also possible to form the guides 25 as part of the top enclosure 23.

A feed port 31 through which originals are supplied is formed between the guides 25 and between the top enclosure 23 and the bottom enclosure 24. A discharge part 32 is formed between the top enclosure 23 and the bottom enclosure 24 downstream of the feed port 31 in the conveying direction X. Thus, an original placed onto the feed port 31 is conveyed in the conveying direction X by the rotating conveying rollers 28 and discharged from the discharge part 32.

The original sensor 29 is disposed upstream of the image sensor 26 in the conveying direction X. The original sensor 29 is an optical sensor configured to detect when an original is fed through the feed port 31. In other words, the original sensor 29 is configured to optically detect an existence of the original at the detection position. The original sensor 29 serves as an example of a detecting device. The detection position of the original sensor 29 is near the feed port 31, and specifically on the downstream side of the feed port 31 in the conveying direction X. The original sensor 29 is configured of a module that includes a light-emitting element for irradiating light toward the detection position, a light-receiving element for receiving light, and a circuit board. The original sensor 29 turns on when the light-receiving element detects light and off when the light-receiving element does not detect light. The original sensor 29 transmits a detection signal to the control device 40.

Figure 4:
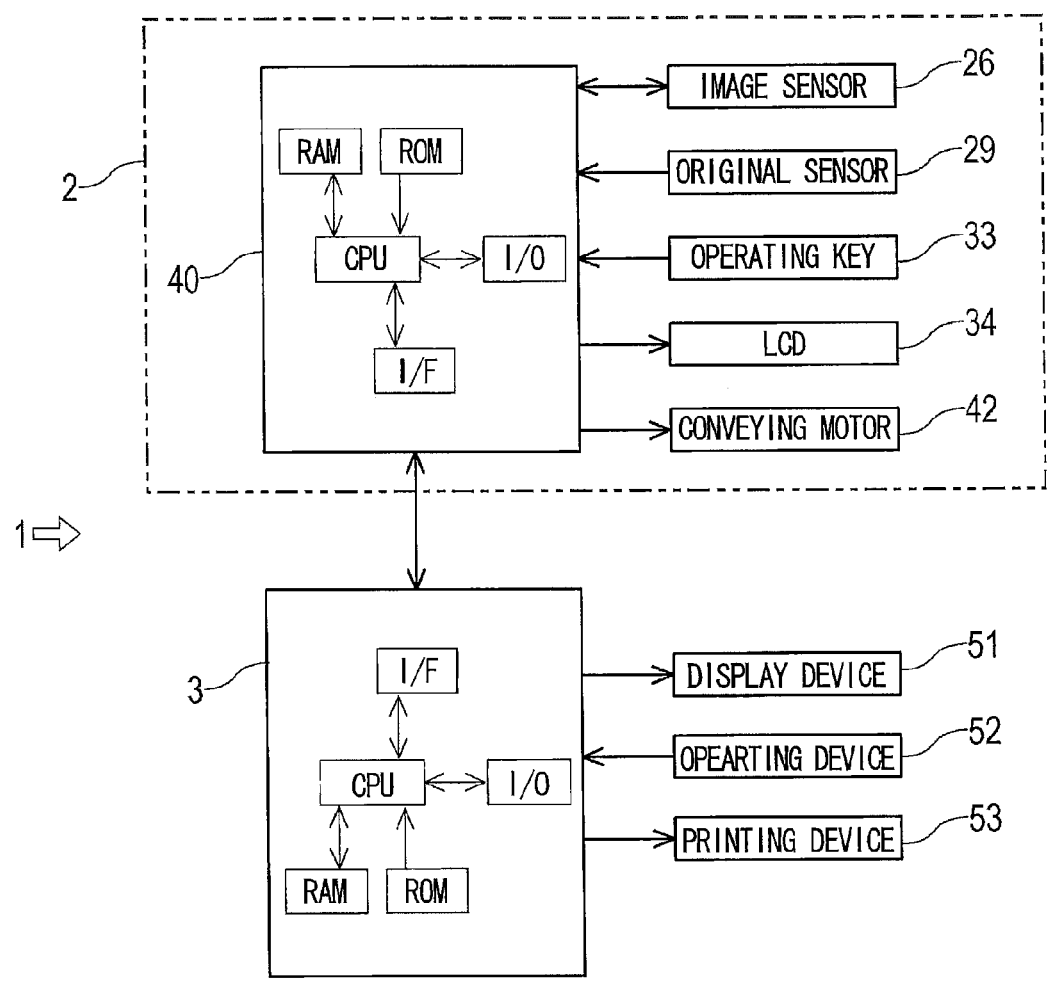
FIG. 4 is a block diagram of the image-processing system.

The control device 40 performs arithmetic processes related to original-reading operations of the scanner 2 and controls components of the scanner 2 during the reading operations. FIG. 4 illustrates the control configuration in the image-processing system 1. As shown in FIG. 4, the control device 40 includes a CPU, internal memory such as RAM and ROM, an input/output (I/O) unit, and an interface (I/F) that are all connected by a bus. The ROM stores programs executed by the CPU, various fixed data, and the like. The programs executed by the CPU are saved on various storage media, such as a flexible disk, CD-ROM, and memory card, and are installed in ROM from these storage media. The RAM temporarily stores data required by the control device 40 when executing programs. The I/O unit inputs detection signals from various sensors and outputs signals to various sensors. More specifically, the image sensor 26 and original sensor 29 input detection signals into the control device 40, and the operating key 33 inputs operation signals into the control device 40. In addition, the control device 40 outputs control signals to the image sensor 26 and the conveying motor 42. The interface (I/F) is a connector that facilitates data transmission and reception between the scanner 2 and an external device, such as the computer 3. Thus, data such as image data of a scanned image and commands such as a read start command are exchanged between the control device 40 and computer 3 via the interface. In the embodiment, the scanner 2 and computer 3 are connected via a cable and are capable of communicating with each other over the cable, but the scanner 2 and computer 3 may be equipped with wireless communicating means and connected to each other wirelessly. Further, power is supplied to the scanner 2 from the computer 3 over a USB bus or the like in this embodiment, but a separate power supply may be provided for the scanner 2.

The control device 40 performs processes to implement the functions of the scanner 2 described later (an image-reading process and a false detection determination process) through a combination of software, such as programs stored in ROM of the control device 40, and hardware, such as the CPU of the control device 40. The control device 40 may execute some of the processes with a single CPU, and may execute some of the processes using a plurality of CPUs or a combination of a CPU and application-specific integrated circuit.

As shown in FIGS. 1 and 4, the computer 3 includes a CPU, internal memory such as RAM and ROM, an input/output (I/O) unit, and an interface (I/F) that are all connected by a bus. The ROM stores programs executed by the CPU of the computer 3, various fixed data, and the like. The programs executed by the CPU of the computer 3 are saved on various storage media, such as a flexible disk, CD-ROM, and memory card, and are installed in ROM from these storage media. The RAM temporarily stores data required by the computer 3 when executing programs. The I/O unit of the computer 3 inputs detection signals from various sensors and outputs signals to various sensors. The interface (I/F) of the computer 3 is a connector that exchanges data with an operating device 52, such as a keyboard and mouse; a display device 51, such as a screen; and a printing device 53, such as a printer. The computer 3 performs processes to implement the functions of processing means for processing scanned image data through a combination of software, such as programs stored in ROM, and hardware, such as the CPU.

Next, the operations of the image-processing system 1 will be described. In general, the scanner 2 of the image-processing system 1 reads an original to generate image data, and then transmits the image data to the computer 3 either automatically or in response to a user operation performed on the computer 3. In this embodiment, image data generated by the image sensor 26 of the scanner 2 is temporarily stored in RAM provided in the scanner 2. The image data is transmitted to the computer 3 after the CPU of the scanner 2 has performed the false detection determination process described later.

Figure 5:
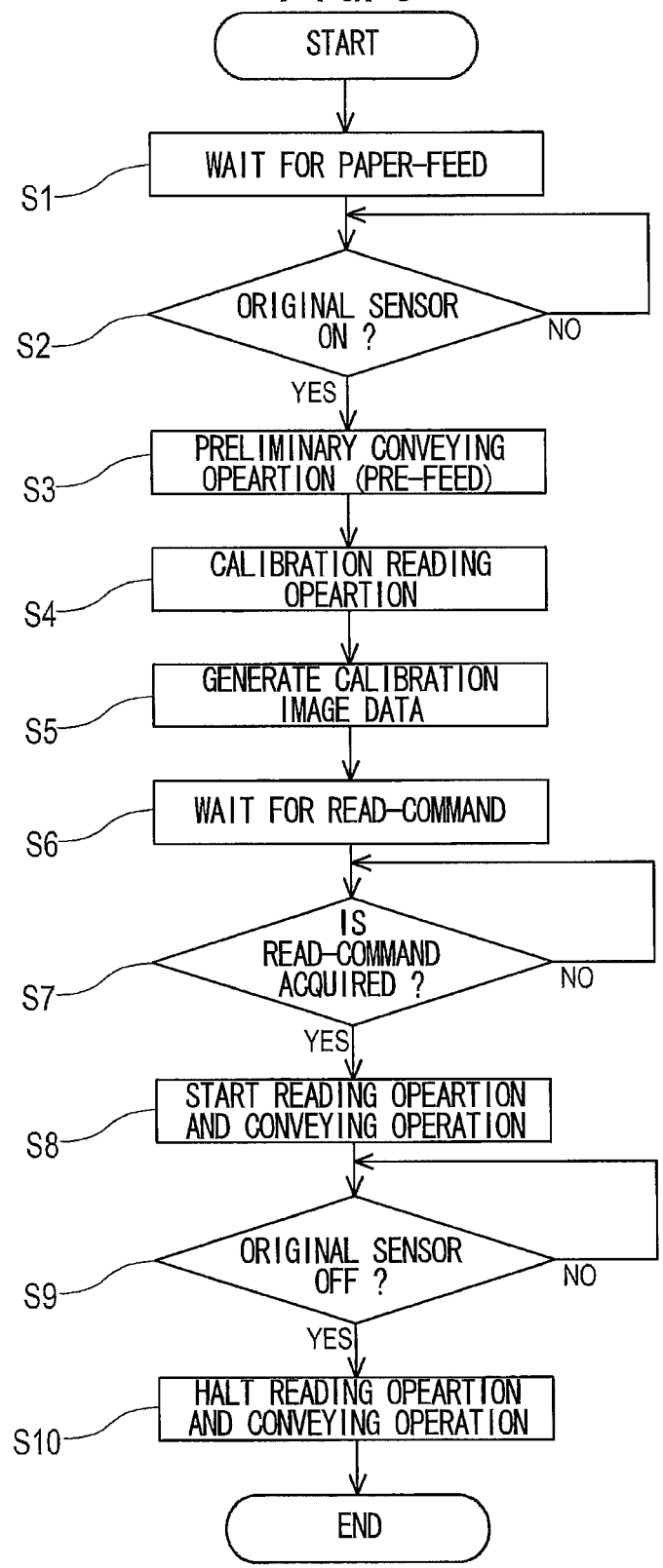
FIG. 5 is a flowchart illustrating steps in an image-reading process performed by the original reading apparatus.

FIG. 5 is a flowchart illustrating steps in an image-reading process performed by the control device 40 of the scanner 2. In S1 of the flowchart in FIG. 5, the scanner 2 enters a paper-feed wait state once the power of the scanner 2 is turned on. When the original sensor 29 turns on, the control device 40 detects that an original has been supplied through the feed port 31 (S2: YES) and in S3 activates the conveying motor 42 to perform a preliminary conveying operation (a pre-feed).

In the pre-feed performed by the conveying motor 42, an original sheet is conveyed from the detection position of the original sensor 29 (or the feed port 31) to the original read position. Hereinafter, the distance in which the leading edge of the original moves during a pre-feed, i.e., the distance in the conveying direction X between the detection position of the original sensor 29 (or the feed port 31) to the read position will be called the "pre-feed length." Thus, in S3 the conveying motor 42 drives the conveying rollers 28 to rotate an amount required to convey the original the pre-feed length in the conveying direction X.

At the start of the pre-feed, or at a point after the start and before the end of the pre-feed, in S4 the control device 40 controls the image sensor 26 to start a calibration reading operation. In S5 the image sensor 26 performs the reading operation prior to the original reaching the read position to generate calibration image data. The image data generated when the image sensor 26 performs the reading operation before the original reaches the read position indicates an overall solid image with a single color (i.e., a solid region) extending in a first direction X' and spanning the entire read image in a second direction Y' orthogonal to the first direction X'. The first direction X' and the second direction Y' correspond to the conveying direction X and the width direction Y, respectively. The control device 40 temporarily stores the calibration image data generated in S5 in RAM to be used as a reference color for determining solid regions. As described above, the read position of the image sensor 26 is a position between the image sensor 26 and the original presser 27 at which the image sensor 26 reads the original (see FIG. 3). Further, a solid region is a single-color region (normally a black region) covering a relatively broad range. The control device 40 identifies an overall solid region by comparing the overall solid region to the reference color of an image indicated by the calibration image data. By calibrating the reference color of the overall solid region in the image-reading process in this way, the control device 40 can identify solid regions properly despite changes in the image sensor 26 that may occur over time or changes in the operating environment of the scanner 2.

In S6 the control device 40 enters a read-command wait state. The read command is inputted through a user operation on the operating key 33 or the computer 3. Upon acquiring a read command (S7: YES), in S8 the control device 40 controls the image sensor 26 to start a reading operation on the original and controls the conveying motor 42 to start a conveying operation for the original in association with the reading operation.

In S9 the control device 40 determines whether the original sensor 29 is off and continually repeats the determination while the original sensor 29 remains on (S9: NO). When the original sensor 29 turns off (S9: YES), the control device 40 detects that the trailing edge of the original has passed the original sensor 29 and in S10 halts the image sensor 26 and conveying motor 42 after first completing the reading operation and conveying operation for a distance equivalent to the pre-feed length. Subsequently, the control device 40 ends the current image-reading process. During this image-reading process, the control device 40 generates data related to the read image of the original read by the image sensor 26 (i.e., the image data), and temporarily stores the generated image data in RAM. At the same time, the CPU of the control device 40 sequentially reads segments of image data stored in RAM and, after performing suitable processes on the image data, transmits the data to the computer 3.

Figure 6:
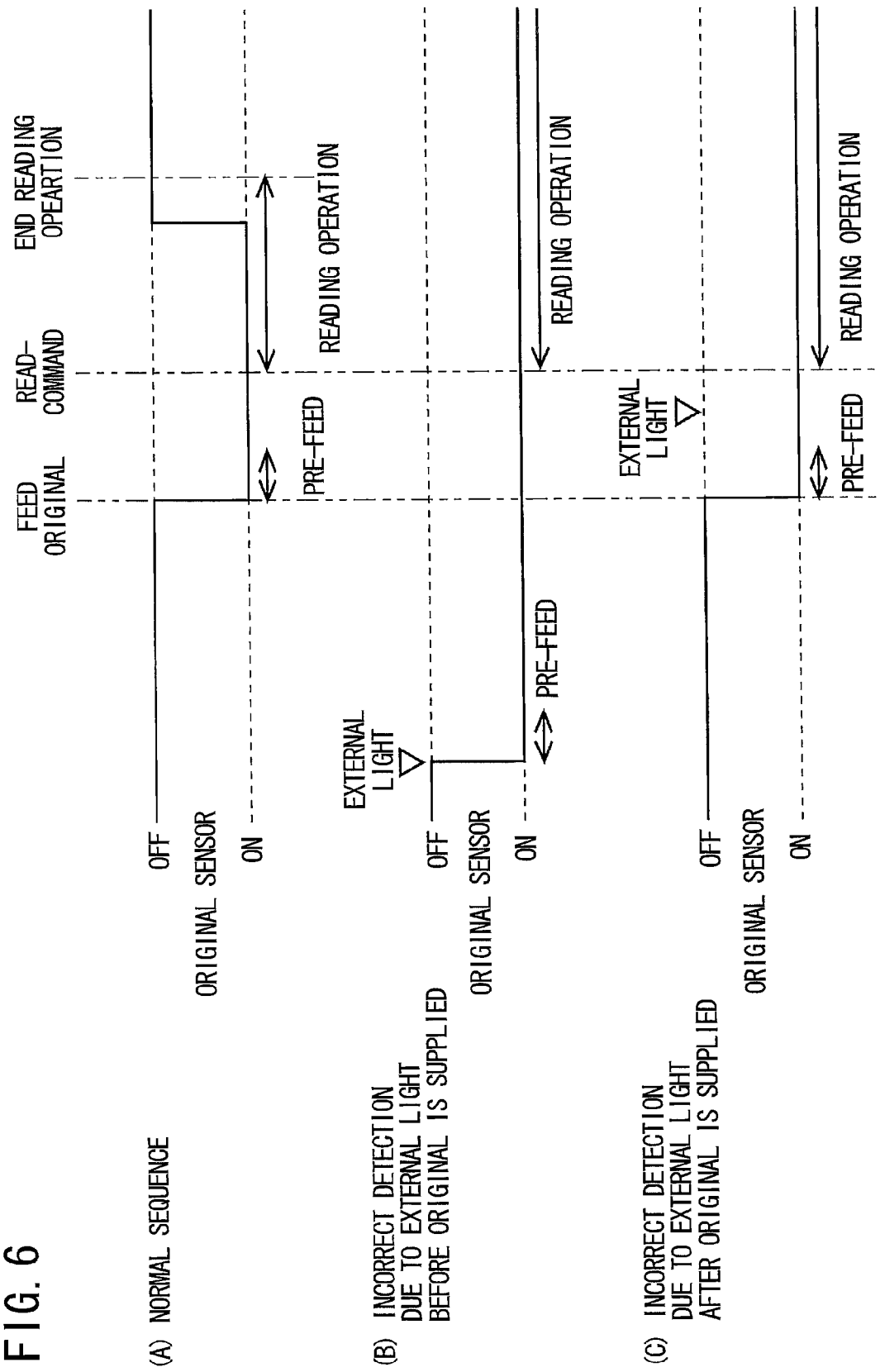
FIG. 6 is an explanatory diagram showing differences in an on/off state of an original sensor in the original reading apparatus, wherein (A) indicates a timing chart in a normal sequence, (B) indicates a timing chart when incorrect detection due to external light occurs before the original is supplied, and (C) indicates a timing chart when the incorrect detection due to external light occurs after the original is supplied.

FIG. 6 shows timing charts indicating the on/off state of the original sensor 29. FIG. 6(A) shows a timing chart for a normal sequence of the image-reading process described above, while the timing charts in FIGS. 6(B) and 6(C) show image-reading processes when the original sensor 29 incorrectly detects an original due to external light. The vertical axis in each timing chart indicates the on/off state of the original sensor 29.

In the normal sequence of the image-reading process shown in FIG. 6(A), the control device 40 performs the pre-feed operation on an original when the original is supplied through the feed port 31, causing the original sensor 29 to turn on. Next, the control device 40 performs a reading operation and a conveying operation on the original after a read command has been inputted. The control device 40 continues the reading operation and the conveying operations for a prescribed time of period after the original sensor 29 turns off, and ends the reading and conveying operations. Through the reading operation, the control device 40 acquires data indicative of a read image (scanned image). The read image grows and is acquired in a first direction X' (FIG. 7) and has a prescribed width in a second direction Y' (FIG. 7) orthogonal to the first direction X'. An upstream side in the first direction X corresponds to a downstream side in the conveying direction X.

The timing chart in FIG. 6(B) shows an image-reading process performed when the original sensor 29 incorrectly detects an original due to external light prior to the original being placed onto the feed port 31. If the light-receiving element of the original sensor 29 receives external light, the external light may be incorrectly detected as light reflected from an original, causing the original sensor 29 to turn on prior to an original being fed through the feed port 31. Consequently, the control device 40 will perform the pre-feed operation despite an original not being present in the feed port 31. Thereafter, the control device 40 will not perform the pre-feed operation, even when an original is actually fed through the feed port 31, because the pre-feed operation has already been performed. When the user then inputs a read command, the control device 40 will start the reading operation and the conveying operation for the original. However, these operations will not end even after the trailing edge of the original moves downstream of the detection position for the original sensor 29 because the original sensor 29 will continue to incorrectly detect the original due to the external light and will not switch off.

Figure 7:
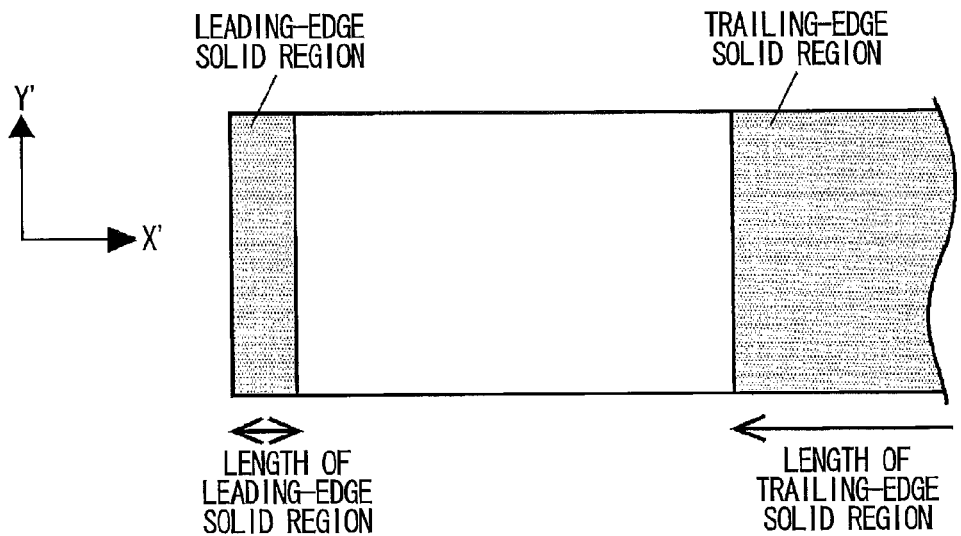
FIG. 7 is an explanatory diagram showing a read image when the incorrect detection occurs.

As shown in FIG. 7, a read image indicated by the image data generated as a result of the image-reading process described above will include a solid region extending in the first direction X' a length equivalent to the pre-feed length from a leading edge of the read image (an upstream edge of the read image in the first direction X7) and spanning the entire width of the read image in the second direction Y', and a solid region continuing from a trailing edge of the read image (an downstream edge of the read image in the first direction X') and spanning the entire width of the scanned image.

Figure 8:
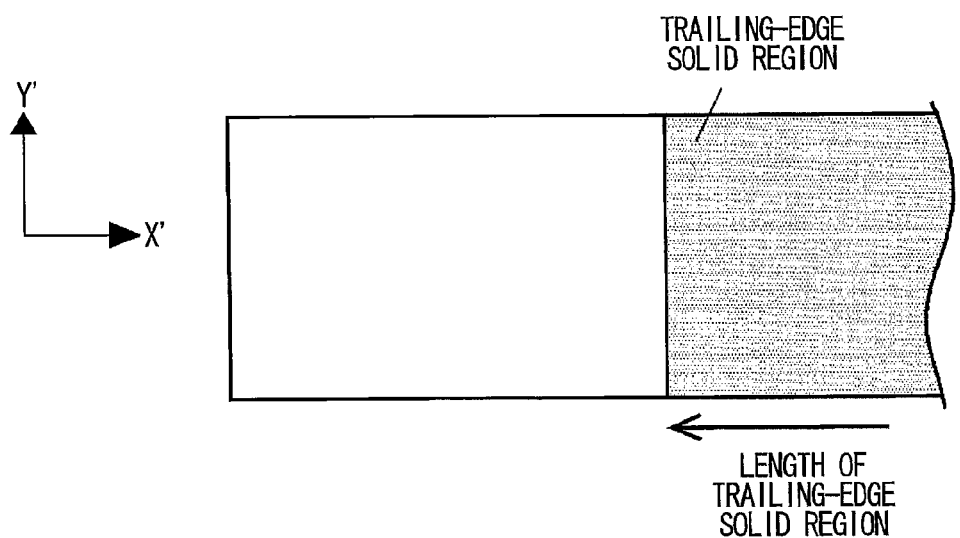
FIG. 8 is an explanatory diagram showing a read image when the incorrect detection occurs.

The timing chart in FIG. 6(C) illustrates an image-reading process performed when the original sensor 29 incorrectly detects an original due to external light after an original has been supplied through the feed port 31. In this case, the original sensor 29 turns on when the original is fed through the feed port 31, causing the control device 40 to perform the pre-feed operation for the original. When the user subsequently inputs a read command, the control device 40 initiates the reading operation and the conveying operation for the original. However, these operations will not end, even when the trailing edge of the original actually passes downstream of the detection position for the original sensor 29 because the original sensor 29 will continue to incorrectly detect the original due to external light and will not switch off. As shown in FIG. 8, a scanned image indicated by the image data generated as a result of this image-reading process will include an overall solid region continuing from the trailing edge (downstream edge) of the scanned image in the first direction X' and spanning the entire width of the scanned image in the second direction Y'.

As described above, the scanner 2 is unable to properly read an original and unable to generate normal image data when the original sensor 29 incorrectly detects an original due to external light. Therefore, in the image-processing system 1 according to the embodiment, either the scanner 2 or computer 3 performs a false detection determination process. The false detection determination process is performed to determine whether the original sensor 29 has incorrectly detected an original due to external light. While either the scanner 2 or computer 3 may perform the false detection determination process, the control device 40 of the scanner 2 performs the false detection determination process in the embodiment. Next, steps in the false detection determination process will be described with reference to the flowcharts in FIGS. 9 and 10.

The CPU of the control device 40 sequentially reads segments of image data stored in RAM and performs the false detection determination process on this data in parallel with the image-reading process. In S21 at the beginning of the false detection determination process in FIG. 9, the control device 40 determines whether a solid region spanning the entire width of the scanned image exists on the upstream edge of the scanned image in the first direction X' (hereinafter called the "leading edge"). A solid region present on the leading edge of the scanned image will be called a "leading-edge solid region." In other words, the leading edge solid region is an overall solid region with a single color, extends from the upstream edge of the scanned image in the first direction X', and has a width equal to the prescribed width of the scanned image. The control device 40 identifies a solid region by comparing the color of each dot in the scanned image data with the single-color of the calibration image data described above.

If the control device 40 determines that a leading-edge solid region exists (S21: YES), in S22 the control device 40 compares the length of the leading-edge solid region in the first direction X' (hereinafter called the "length of the leading-edge solid region"; see FIG. 7) to a first comparison value. The first comparison value is calculated by adding a suitable margin value to the pre-feed length. If the control device 40 determines that the length of the leading-edge solid region exceeds the first comparison value based on the pre-feed length (S22: YES), in S23 the control device 40 determines that the original sensor 29 falsely detected an original due to external light (hereinafter called a "false detection from external light" or "incorrect detection due to external light") and that slippage or a failed pick-up has occurred between the conveying rollers 28 and the original (hereinafter called "conveying slippage"). If the leading-edge solid region were caused only by a false detection from external light, then the length of the leading-edge solid region would be approximately equal to the pre-feed length. Therefore, conveying slippage (a malfunction in the conveying operation) is also inferred when the length of the leading-edge solid region exceeds the first comparison value.

If the control device 40 determines that the length of the leading-edge solid region is approximately equal to the pre-feed length (S22: NO, S24: YES), in S25 the control device 40 determines that a false detection from external light has occurred. Here, the length of the leading-edge solid region may be considered substantially equivalent to the pre-feed length both for cases in which the two lengths are exactly equal and for cases in which the two lengths are substantially equal within a suitable margin of error. If the control device 40 determines whether or not two lengths are exactly equal in S24, the first comparison value and a second comparison value described later may be equal to the pre-feed length.

When the control device 40 determines that the length of the leading-edge solid region is less than the second comparison value (S22: NO, S24: NO, S26: YES), in S27 the control device 40 determines that conveying slippage has occurred. The second comparison value is calculated by subtracting a suitable margin value from the pre-feed length. That is, when the length of the leading-edge solid region is less than the second comparison value based on the pre-feed length, the control device 40 does not determine that a false detection from external light occurred prior to the original being fed through the feed port 31, but infers that the leading-edge solid region was produced due to conveying slippage. As described above, the second comparison value is used in S22 through S26 as an example of a prescribed length for determining whether or not the false detection from external light exists. Further, the first comparison value is used in S22 through S26 as an example of a prescribed length for determining whether or not the conveying slippage occurs. In other words, the control device 40 determines whether or not the read image includes the overall solid region having a length in the first direction X' longer than or equal to the second comparison value and having the prescribed width in the second direction Y'. Further, in S26 the control device 40 determines whether or not the read image includes the leading edge solid region having a length shorter than the second comparison value and having the prescribed width.

After each of steps S23, S25, and S27, in S28 the control device 40 determines whether conveying slippage has occurred. If conveying slippage has occurred (S28: YES), in S29 the control device 40 outputs a signal indicating that conveying slippage occurred to at least one of the computer 3, the conveying motor 42, and the notifying device provided in the scanner 2. The notifying device may be a display, lamp, or buzzer, but is the liquid crystal display 34 in this embodiment. As a result, the liquid crystal display 34 and the computer 3 can notify the user of the conveying slippage. Further, the control device 40 can control the conveying motor 42 to reduce the rotational speed of the conveying rollers 28 in order to reduce the conveying speed of the original. Note that, in S29, the control device 40 may also increase the nip pressure applied to the original by the conveying rollers 28 in addition to or instead of reducing the rotational speed of the conveying rollers 28. Both reducing the conveying speed of the original and increasing nip pressure on the original is effective for reducing slippage between the conveying rollers 28 and the original.

In S30 of FIG. 10, the control device 40 determines whether the scanned image includes an overall solid region that spans the entire width of the scanned image and is not the leading-edge solid region (hereinafter called a "trailing-edge solid region"). Thus, a trailing-edge solid region is an overall solid region with a single color and that spans the width of the scanned image in the second direction Y' and begins from a position in the first direction X' excluding the leading edge of the scanned image. Further, the trailing-edge solid region is separated from the leading-edge solid region. If the scanned image includes a trailing-edge solid region (S30: YES), in S31 the control device 40 determines whether a false detection from external light was determined from the leading-edge solid region. If a false detection from external light was determined from the leading-edge solid region (S31: YES), in S32 the control device 40 forcibly halts the image sensor 26 and the conveying motor 42, ending the reading operation and the conveying operation for the original. Note that when a false detection from external light has been determined from the leading-edge solid region, the control device 40 may halt or end the reading operation and the conveying operation for the original while still reading the trailing-edge solid region, even when the length of the trailing-edge solid region in the first direction X' is less than the pre-feed length.

On the other hand, if a trailing-edge solid region exists but a false detection from external light was not determined (S30: YES, S31: NO), there is a possibility that the overall solid region in the scanned image corresponds to a solid image included in the original. Therefore, in S33 the control device 40 determines whether the length of the trailing-edge solid region in the first direction X' (hereinafter simply called the "length of the trailing-edge solid region"; see FIGS. 7 and 8) is greater than or equal to the pre-feed length. If the control device 40 determines that the length of the trailing-edge solid region is less than the pre-feed length (S33: NO), the control device 40 ends the false detection determination process. On the other hand, if the length of the trailing-edge solid region is greater than or equal to the pre-feed length (S33: YES), in S34 the control device 40 determines whether the original sensor 29 has detected the trailing edge of the original within a prescribed maximum reading length or maximum reading time. If the control device 40 determines that the trailing edge of the original was not detected during this maximum reading length or time (S34: NO) (for example, if the original sensor 29 continues to detect the existence of the original after a length of the scanned image exceeds the maximum length), in S35 the control device 40 determines that a false detection from external light has been made and that conveying slippage has occurred. Here, the maximum reading length is the maximum value for the reading length of an original that can be scanned by the scanner 2, such as the maximum value for the length of a legal size sheet. In addition, the maximum reading time is the maximum value for the reading time of an original that can be scanned by the scanner 2, such as the time required to convey a prescribed number of originals (one or more) at a prescribed conveying speed.

It may be inferred that a false detection from external light has occurred when the original sensor 29 does not detect the trailing edge of the original within the maximum reading length or maximum reading time. When a false detection from external light occurs, the original sensor 29 remains on when the trailing edge of the original passes through the detection position of the original sensor 29. Therefore, in S32 the control device 40 forcibly halts the image sensor 26 and conveying motor 42 to end the reading operation and conveying operation for the original.

The control device 40 determines in S36 that conveying slippage has occurred when the length of the trailing-edge solid region is greater than or equal to the pre-feed length (S33: YES) and the original sensor 29 has detected the trailing edge of the original within the prescribed maximum reading length or time (S34: YES).

After steps S32 or S36, the control device 40 determines in S37 whether at least one of a false detection from external light and conveying slippage has occurred. If at least one has occurred (S37: YES), in S38 the control device 40 outputs a signal indicating the error to at least one of the liquid crystal display 34 and the computer 3. On the basis of the signal, the liquid crystal display 34 notifies the user that one or both of the false detection from external light and conveying slippage has occurred. The computer 3 also notifies the user that one or both of the false detection from external light and the conveying slippage has occurred by displaying this information on the display device 51 connected to the computer 3. When a determined that the false detection from external light occurs in S23 or S25, the control device 40 outputs a signal indicative of incorrect detection of the existence of the original by the original sensor 29. When the read image includes the trailing-edge solid region and the original sensor 29 does not detect the existence of the original until the image sensor 26 completes to perform the reading operation for the maximum length (S34: YES), the control device 40 outputs a signal indicative of a failure of the conveying operation in S38.

With the configuration described above, the scanner 2 can determine the incorrect detection of the existence of original by the original sensor 29 due to external light occurs, on the basis of a read image that is read by the image sensor 26. Accordingly, it is possible to notify the user of the incorrect detection and to execute a suitable process to adjust the detection state.

While the invention has been described in detail with reference to a specific embodiment, it would be apparent to those skilled in the art that many modifications and variations may be made therein.

Figure 9:
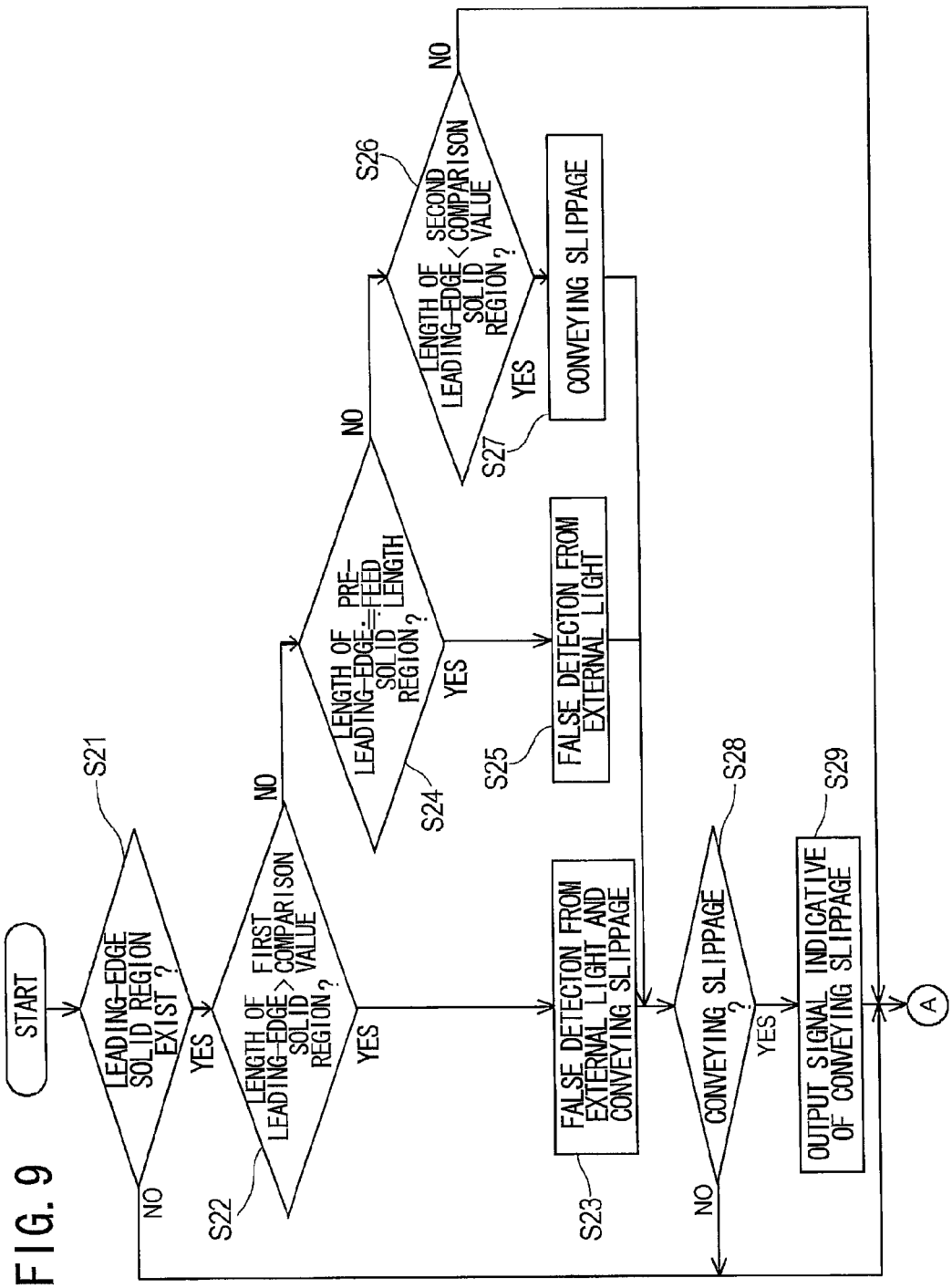

In the false detection determination process of FIGS. 9 and 10, the control device 40 notifies the user of a false detection from external light in the latter stage of the process (S38), but the user may be notified immediately after the leading-edge solid region has been detected. In this case, after the leading-edge solid region is detected, the control device 40 should quickly output a signal indicating a false detection from external light to one or both of the notifying device in the scanner 2 and the computer 3 and forcibly halt the original sensor 29 and conveying motor 42 in order to end the reading operation and the conveying operation on the original.

Further, while scanned image data is not processed in the false detection determination process of the embodiment, processes for optimizing the scanned image data may be performed. For example, the control device 40 of the scanner 2 or the computer 3 may perform a process to delete data corresponding to both the leading-edge solid region and the trailing-edge solid region from the scanned image data, and may adjust the scanned image data or generate new image data in S38. The adjusted image data or the new image data indicates an image that is identical to the scanned image without the leading-edge solid region and the trailing-edge solid region. When the control device 40 of the scanner 2 performs the deleting process, suitable scanned image data with solid regions removed is transmitted from the scanner 2 to the computer 3. When the computer 3 performs the deleting process, the scanner 2 transmits the scanned image data to be processed to the computer 3, and the computer 3 performs the process on the scanned image data. In this way, the computer 3 can obtain suitable scanned image data (i.e., image data corresponding to an image without the overall solid regions) without having the scanner 2 rescan the original.

Further, the image-processing system 1 may be configured such that the scanner 2 can be set to not execute the false detection determination process described in the embodiment. For example, the false detection determination process is not necessary when the operating environment of the scanner 2 has no external light. Therefore, the user can input a setting through an inputting unit provided on the scanner 2 or computer 3 in order to set the scanner 2 so as not to perform the false detection determination process.

Although the control device 40 of the scanner 2 performs the false detection determination process in the embodiment, the computer 3 may perform this process instead. In this case, the scanner 2 transmits scanned image data generated by the image sensor 26 to the computer 3, and the computer 3 performs the false detection determination process on this data. More specifically, steps S21-S38 in the false detection determination process of the embodiment may be re-interpreted while replacing all mentions of the control device 40 in the scanner 2 with the computer 3. Further, while the scanner 2 transmits scanned image data to the computer 3 in the false detection determination process and the image-reading process described above, the scanned image data may be stored in external memory or internal memory provided in the scanner 2.

The image-processing system 1 according to the embodiment described above can determine when the original sensor 29 has made a false detection from external light. Unlike conventional multifunction peripherals and scanners provided with a copy function and the like, the portable scanner 2 of the embodiment is more susceptible to false detections from external light because the original sensor 29 is positioned near the feed port 31. Therefore, by determining that a false detection from external light has occurred and notifying the user as described above, the scanner 2 can prompt the user to take action by modifying the position or orientation of the scanner 2 or shielding the scanner 2 from external light with a curtain or the like, for example.

In addition to determining false detection from external light, the image-processing system 1 of the embodiment can detect the occurrence of slippage between the conveying rollers 28 and the original. When conveying slippage occurs, the scanner 2 is unable to properly read the original and cannot generate normal scanned image data. Therefore, by detecting conveying slippage and notifying the user as described in the embodiment, the scanner 2 can prompt the user to take action by adjusting the nip pressure applied by the conveying rollers 28, adjusting the conveying speed for the original, and cleaning the conveying rollers 28, for example.

While the portable scanner 2 is used in the above-described embodiment as an example of the original reading apparatus, the original reading apparatus may be another device such as a multifunction peripheral, copier, and printer provided with a scanner and is not limited to a standalone portable scanner 2.

In the above-described embodiment, the ADF of the scanner 2 performs a pre-feed for an original, but the pre-feed may be omitted. In this case, the scanner 2 conveys and reads the original in the image-reading process once the original is supplied through the feed port 31, without performing the pre-feed. Consequently, in the false detection determination process, the control unit 40 compares the length of the overall solid region in the first direction X' to the distance in the conveying direction X from the detection position of the original sensor 29 to the read position of the image sensor 26.

In the image-reading process performed by the scanner 2 in the above-described embodiment, the control unit 40 waits for a read command before initiating the reading operation on the original. However, the control unit 40 may begin reading an original as soon as the original is supplied through the feed port 31. In other words, the control unit 40 may control the conveying mechanism and the reading device to start the conveying operation and the reading operation when the original sensor 29 detects the existence of the original at the detection position.

Further, the scanner 2 according to the above-described embodiment may be configured to increase sensitivity of the original sensor 29 to a prescribed value (raise the pull-up resistance of the circuit to a prescribed value) when the original sensor 29 is off and to output a signal from the control unit 40 to the notifying device of the scanner 2 or the computer 3 indicating that there is potential for a false detection from external light when the original sensor 29 switches on.

Alternatively, the scanner 2 according to the above-described embodiment may be configured such that the control unit 40 outputs a signal to the notifying device or the computer 3 indicating the potential for false detection from external light when the contrast value of the liquid crystal display 34 is set greater than a prescribed value.

Further, the determinations of S22, S24, and S26 may be performed in a different order. For example, the controller 40 may perform the determination of S26 and then advances to the process of S22 when the length of leading edge solid region is not determined to be smaller than the second comparison value in S26 (S26: YES).

What is claimed is:

1. An original reading apparatus comprising:
a conveying mechanism configured to perform a conveying operation to convey an original in a conveying direction;
a reading device configured to perform a reading operation to read the original that is conveyed by the conveying mechanism;
a detecting device disposed upstream of the reading device in the conveying direction and configured to optically detect an existence of the original at a detection position; and
a control device configured to:
control, when the detecting device detects the existence of the original at the detection position, the conveying mechanism and the reading device to start the conveying operation and the reading operation to acquire a read image, the read image being acquired in a first direction and having a prescribed width in a second direction orthogonal to the first direction, the first direction corresponding to the conveying direction;
determine whether or not the read image includes an overall solid region with a single color, the overall solid region having a length in the first direction longer than or equal to a prescribed length and having a width in the second direction equal to the prescribed width; and
output a signal indicative of incorrect detection of the existence of the original by the detecting device due to external light when it is determined that the read image includes the overall solid region.

2. The original reading apparatus according to claim 1, wherein the control device is further configured to:
determine whether or not the read image includes an upstream solid region, the upstream solid region being an overall solid region with a single color and extending from an upstream edge of the read image in the first direction, the upstream solid region having a length in the first direction shorter than the prescribed length and having a width in the second direction equal to the prescribed width; and
output a signal indicative of a failure of the conveying operation performed by the conveying mechanism when it is determined that the read image includes the upstream solid region.

3. The original reading apparatus according to claim 1, wherein the control device is further configured to:
determine whether or not the read image includes an upstream solid region, the upstream solid region being an overall solid region with a single color and extending from an upstream edge of the read image in the first direction, the upstream solid region having a length in the first direction shorter than the prescribed length and having a width in the second direction equal to the prescribed width; and control, when it is determined that the read image includes the upstream solid region, the conveying mechanism to perform at least one of: reducing a conveying speed of the original; and increasing nip pressure on the original.

4. The original reading apparatus according to claim 1, wherein the control device is further configured to output a signal indicative of a failure of the conveying operation performed by the conveying mechanism when the detecting device continues to detect the existence of the original after a length of the read image in the first direction exceeds a maximum length, the maximum length being a predetermined length of the original that the reading device is capable of reading.

5. The original reading apparatus according to claim 1, wherein the control device is further configured to:

determine whether or not the read image includes a downstream solid region, the downstream solid region being an overall solid region with a single color and extending from a downstream edge of the read image in the first direction, the downstream solid region having a width in the second direction equal to the prescribed width; and determine whether or not the detecting device detects the existence of the original; and output a signal indicative of a failure of the conveying operation performed by the conveying mechanism when the read image includes the downstream solid region and the detecting device detects non-existence of the original until the reading device completes to perform the reading operation for a maximum length, the maximum length being a predetermined length that the reading device is capable of reading.

6. The original reading apparatus according to claim 1, wherein the control device is further configured to control the reading device to halt the reading operation when the read image includes a first solid region and a second solid region, the first solid region being an overall solid region with a single color and extending from an upstream edge of the read image in the first direction, the upstream solid region having a length in the first direction longer than or equal to the prescribed length and having a width in the second direction equal to the prescribed width, the second solid region being an overall solid region with a single color and having a width direction equal to the prescribed width, the second solid region being separated from the first solid region in the first direction.

7. The original reading apparatus according to claim 1, wherein the control device is further configured to:

control, before the conveying operation and the reading operation are started, the reading device to perform a calibration reading operation to acquire another read image with a single color; and identify the overall solid region in the read image based on the single color of the another read image.

8. The original reading apparatus according to claim 1, further comprising a notifying device configured to notify, based on the signal that is outputted from the control device, the incorrect detection of the existence of the original by the detecting device due to external light; and wherein the control device is further configured to control, when the overall solid region extends from an upstream edge of the read image in the first direction, the reading device, the conveying mechanism, and the notifying device such that:

the notifying device notifies the incorrect detection of the existence of the original by the detecting device due to external light;

the reading device halts the reading operation; and the conveying mechanism halts the conveying operation.

9. The original reading apparatus according to claim 1, wherein the conveying operation and the reading operation are performed together to acquire the read image;

wherein the control device is further configured to control, before the conveying operation and the reading operation, the conveying mechanism to perform a preliminary conveying operation that the conveying mechanism conveys a downstream edge of the original in the conveying direction from the detection position to a read position that the reading device can read the original;

wherein the prescribed length is equivalent to a distance between the detection position and the read position.

10. The original reading apparatus according to claim 1, wherein the control device is further configured to:

generate first data indicative of the read image when the reading device performs the reading operation; and generate second data based on the first data when the overall solid region extends from an upstream edge of the read image in the first direction, the second data being indicative of an image that is identical to the read image without the overall solid region.

11. A non-transitory computer-readable storage medium storing a set of program instructions executed by one of an original reading apparatus and a computer connected to the original reading apparatus, the original reading apparatus including a conveying mechanism, a reading device, a detecting device, and a control device, the conveying mechanism being configured to perform a conveying operation to convey an original in a conveying direction, the reading device being configured to perform a reading operation to read the original that is conveyed by the conveying mechanism, the detecting device being disposed upstream of the reading device in the conveying direction and configured to optically detect an existence of the original at a detection position, the control device being configured to control, when the detecting device detects the existence of the original at the detection position, the conveying mechanism and the reading device to start the conveying operation and the reading operation to acquire a read image, the program instructions causing the one of the original reading apparatus and the computer to:

determine whether or not the read image includes an overall solid region with a single color, the read image being acquired in a first direction and having a prescribed width in a second direction orthogonal to the first direction, the first direction corresponding to the conveying direction, the overall solid region having a length in the first direction longer than or equal to a prescribed length and having a width in the second direction equal to the prescribed width; and output a signal indicative of incorrect detection of the existence of the original by the detecting device due to external light when it is determined that the read image includes the overall solid region.

12. The non-transitory computer-readable storage medium according to claim 11, wherein the program instructions further cause the one of the original reading apparatus and the computer to:

determine whether or not the read image includes an upstream solid region, the upstream solid region being an overall solid region with a single color and extending from an upstream edge of the read image in the first direction, the upstream solid region having a length in the first direction shorter than the prescribed length and having a width in the second direction equal to the prescribed width; and control, when it is determined that the read image includes the upstream solid region, the conveying mechanism to perform at least one of: reducing a conveying speed of the original; and increasing nip pressure on the original.

13. The non-transitory computer-readable storage medium according to claim 11, wherein the overall solid region extends from an upstream edge of the read image in the first direction.

14. A control method executed by one of an original reading apparatus and a computer connected to the original reading apparatus, the original reading apparatus including a conveying mechanism, a reading device, a detecting device, and a control device, the conveying mechanism being configured to perform a conveying operation to convey an original in a conveying direction, the reading device being configured to perform a reading operation to read the original that is conveyed by the conveying mechanism, the detecting device being disposed upstream of the reading device in the conveying direction and configured to optically detect an existence of the original at a detection position, the control device being configured to control, when the detecting device detects the existence of the original at the detection position, the conveying mechanism and the reading device to start the conveying operation and the reading operation to acquire a read image, the method comprising:

determining whether or not the read image includes an overall solid region with a single color, the read image being acquired in a first direction and having a prescribed width in a second direction orthogonal to the first direction, the first direction corresponding to the conveying direction, the overall solid region having a length in the first direction longer than or equal to a prescribed length and having a width in the second direction equal to the prescribed width; and outputting a signal indicative of incorrect detection of the existence of the original by the detecting device due to external light when it is determined that the read image includes the overall solid region.

15. The control method according to claim 14, further comprising:

determining whether or not the read image includes an upstream solid region, the upstream solid region being an overall solid region with a single color and extending from an upstream edge of the read image in the first direction, the upstream solid region having a length in the first direction shorter than the prescribed length and having a width in the second direction equal to the prescribed width; and controlling, when it is determined that the read image includes the upstream solid region, the conveying mechanism to perform at least one of: reducing a conveying speed of the original;

and increasing nip pressure on the original.

16. The control method according to claim 14, wherein the overall solid region extends from an upstream edge of the read image in the first direction.

17. The original reading apparatus according to claim 1, wherein the control device is further configured to identify the overall solid region in the read image based on reference data, the reference data being data corresponding to a reading value acquired by the reading device when the original is not present.

18. The original reading apparatus according to claim 1, wherein the conveying operation and the reading operation are performed together to acquire the read image;

wherein the control device is further configured to control, before the conveying operation and the reading operation, the conveying mechanism to perform a preliminary conveying operation that the conveying mechanism conveys a downstream edge of the original in the conveying direction from the detection position to a position downstream of the detection position in the conveying direction; and wherein the overall solid region extends from an upstream edge of the read image in the first direction.

19. An original reading apparatus comprising:

a conveying mechanism configured to perform a conveying operation to convey an original in a conveying direction;

a reading device configured to perform a reading operation to read the original that is conveyed by the conveying mechanism;

a detecting device disposed upstream of the reading device in the conveying direction and configured to optically detect an existence of the original at a detection position; and a control device configured to:

control, when the detecting device detects the existence of the original at the detection position, the conveying mechanism and the reading device to start the conveying operation and the reading operation to acquire a read image, the read image being acquired in a first direction and having a prescribed width in a second direction orthogonal to the first direction, the first direction corresponding to the conveying direction;

determine whether or not the read image includes a first solid region, the first solid region being an overall solid region with a single color and extending from an upstream edge of the read image in the first direction, the first solid region having a length in the first direction longer than or equal to a prescribed length and having a width in the second direction equal to the prescribed width;

determine whether or not the read image includes a second solid region, the second solid region being an overall solid region with a single color and having a width in the second direction equal to the prescribed width, the second solid region being separated from the first solid region in the first direction; and output a signal indicative of incorrect detection of the existence of the original by the detecting device due to external light when it is determined that the read image includes the first solid region and the second solid region.

20. The original reading apparatus according to claim 19, wherein the control device is further configured not to output the signal indicative of incorrect detection of the existence of the original by the detecting device due to external light when it is determined that the read image includes the first solid region and the read image does not include the second solid region.

* * * * *